(12) United States Patent
Harris et al.

(10) Patent No.: US 11,034,310 B2
(45) Date of Patent: Jun. 15, 2021

(54) TRUCKS INCLUDING EXTERNALLY MOUNTED SPEAKER ENCLOSURES AND METHODS OF MOUNTING SPEAKER ENCLOSURES

(71) Applicant: Toyota Motor Engineering & Manufacturing North America, Inc., Plano, TX (US)

(72) Inventors: Ryan C. Harris, Saline, MI (US); Edgardo Reyes-Crespo, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 183 days.

(21) Appl. No.: 16/507,585

(22) Filed: Jul. 10, 2019

(65) Prior Publication Data

US 2021/0009047 A1    Jan. 14, 2021

(51) Int. Cl.
*B60R 11/02* (2006.01)
*H04R 1/02* (2006.01)
*B60R 11/00* (2006.01)

(52) U.S. Cl.
CPC .......... *B60R 11/0217* (2013.01); *H04R 1/025* (2013.01); *B60R 2011/0003* (2013.01); *B60R 2011/0042* (2013.01); *H04R 2201/021* (2013.01); *H04R 2499/13* (2013.01)

(58) Field of Classification Search
CPC ......... B60R 11/0217; B60R 2011/0003; B60R 2011/0042; H04R 2201/021; H04R 1/025; H04R 2499/13

USPC ............................................. 381/86; 181/141
See application file for complete search history.

(56) References Cited

U.S. PATENT DOCUMENTS

| 5,008,944 A | * | 4/1991 | Sels .................... B60R 11/0217 |
| | | | 181/141 |
| 5,228,090 A | | 7/1993 | Marler |
| 5,750,942 A | * | 5/1998 | Flick ....................... H04R 5/02 |
| | | | 181/141 |

FOREIGN PATENT DOCUMENTS

| AU | 2016100879 A4 | 7/2016 |
| CN | 203580816 U | 5/2014 |
| CN | 203590392 U | 5/2014 |
| JP | 2017114475 A | 6/2017 |

OTHER PUBLICATIONS

How to do a blow through stereo (sideshow) elemental designs 13av.2 (https://www.youtube.com/watch?v=fgRQy40gGOU), Feb. 8, 2010.

(Continued)

*Primary Examiner* — Paul Kim
*Assistant Examiner* — Ubachukwu A Odunukwe
(74) *Attorney, Agent, or Firm* — Dinsmore & Shohl LLP

(57) ABSTRACT

A pickup truck includes a passenger cabin that includes a rear wall. A truck bed includes a front wall that faces the rear wall of the passenger cabin. A space is provided between the rear wall of the passenger cabin and the front wall of the truck bed. A speaker assembly includes a speaker enclosure mounted externally to the rear wall of the passenger cabin and located between the rear wall of the passenger cabin and the front wall of the truck bed. A speaker extends forward from the speaker enclosure and through an opening in the rear wall of the passenger cabin.

17 Claims, 5 Drawing Sheets

(56) References Cited

OTHER PUBLICATIONS

Cutting through the cabin w/ accordion boot | 3:1 ratio 4th order bandpass subwoofer box build (https://www.youtube.com/watch?reload=9&v=hMaTGkQiOSc), Jun. 30, 2015.

* cited by examiner

TRUCKS INCLUDING EXTERNALLY MOUNTED SPEAKER ENCLOSURES AND METHODS OF MOUNTING SPEAKER ENCLOSURES

TECHNICAL FIELD

The present specification generally relates to speaker systems for vehicles and, more specifically, to pickup trucks that include externally mounted speaker enclosures and methods of mounting speaker enclosures.

BACKGROUND

Vehicles typically have audio systems that are often a part of an infotainment system. The audio systems may include a head unit that is used to control the audio system and an array of speakers positioned throughout the vehicle. It is known to provide the audio systems with a subwoofer, which is typically placed within a speaker box. These speaker boxes can be large and occupy a large amount of space within a cabin of a vehicle. It is known to put subwoofers and speaker boxes inside a trunk of the vehicles. Pickup trucks, however, do not have trunks and instead have truck beds that may or may not be open to the elements. Further, truck beds are typically isolated from the cabin of the pickup trucks. What is needed is an externally mounted speaker enclosure and methods of mounting speaker enclosures that save space within the cabin while providing satisfactory sound quality.

SUMMARY

In accordance with one embodiment, a pickup truck includes a passenger cabin that includes a rear wall. A truck bed includes a front wall that faces the rear wall of the passenger cabin. A space is provided between the rear wall of the passenger cabin and the front wall of the truck bed. A speaker assembly includes a speaker enclosure mounted externally to the rear wall of the passenger cabin and located between the rear wall of the passenger cabin and the front wall of the truck bed. A speaker extends forward from the speaker enclosure and through an opening in the rear wall of the passenger cabin.

In another embodiment, a method of installing a speaker assembly into a pickup truck is provided. The method includes inserting a speaker through an opening in a rear wall of a passenger cabin of the pickup truck. A speaker enclosure is mounted to the rear wall of the passenger cabin. The speaker enclosure is located between a front wall of a truck bed and the rear wall of the passenger cabin, the speaker extending forward from the speaker enclosure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. The trucks include an audio system that includes one or more speaker assemblies for providing sound within the passenger cabin. One speaker assembly may include a subwoofer that is connected to a speaker enclosure. The speaker enclosure is mounted between the passenger cabin and the truck bed. In particular, a space is provided between the truck bed and the passenger cabin to allow the speaker enclosure to be mounted therebetween. The speaker assembly includes a speaker that extends forward from the speaker enclosure, through a rear wall and into the passenger cabin. The speaker may be located behind a seat of the truck thereby hiding the speaker and the speaker enclosure from view of occupants.

Figure 1:
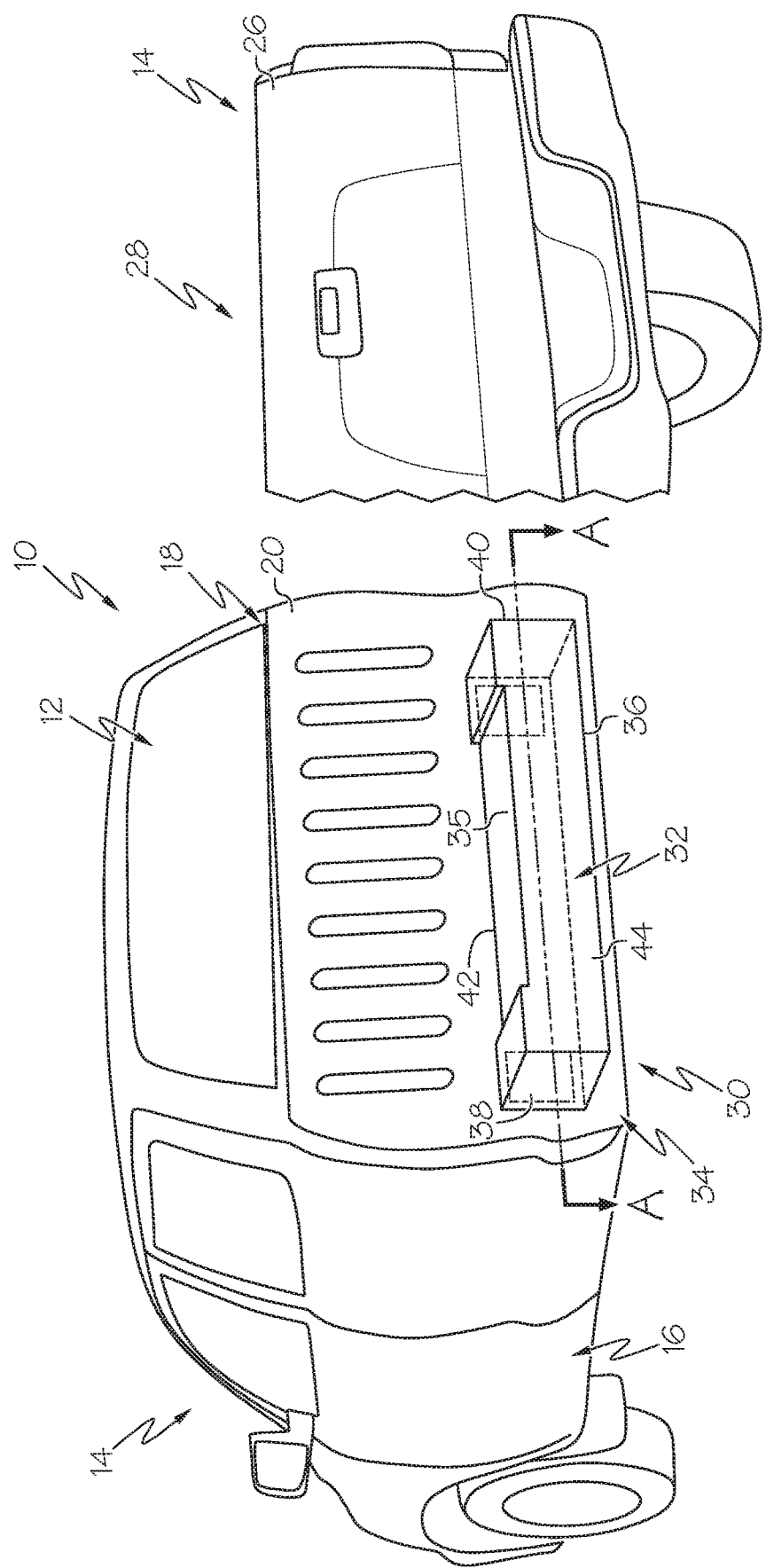
FIG. 1 schematically depicts a partial view of a pickup truck having a truck bed with a with a speaker assembly and an externally mounted speaker enclosure, according to one or more embodiments shown and described herein.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, the pickup truck is generally illustrated at 10. The pickup truck 10 includes a passenger cabin 12 and a truck bed 14. The passenger cabin 12 includes a front 14, sides 16 and a rear 18 where a rear wall 20 of the passenger cabin 12 is located. The truck bed 14 includes a floor 22 (FIG. 2), a pair of spaced apart sidewalls (removed for clarity), a front wall 24, and a rear wall 26. The floor 22, the sidewalls, the front wall 24, and the rear wall 26 define a storage area 28 of the truck bed 14.

In some embodiments, it is appreciated, that the rear wall 26 is pivotally connected to the sidewalls as a tailgate for movement between a closed position and an open position. In the closed position, the rear wall 26 extends parallel to the vehicle vertical direction. In the open position, the rear wall 26 extends parallel to the vehicle longitudinal direction.

Figure 2:
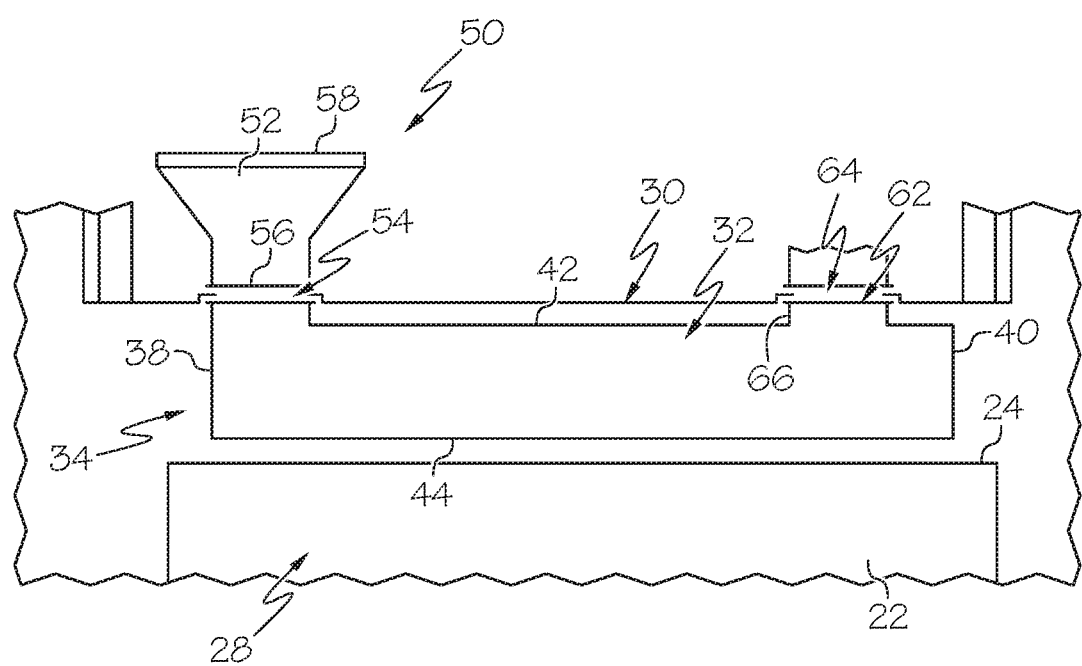
FIG. 2 schematically depicts a schematic, section view of the pickup truck of FIG. 1 along line A-A, according to one or more embodiments shown and described herein.
Figure 3:
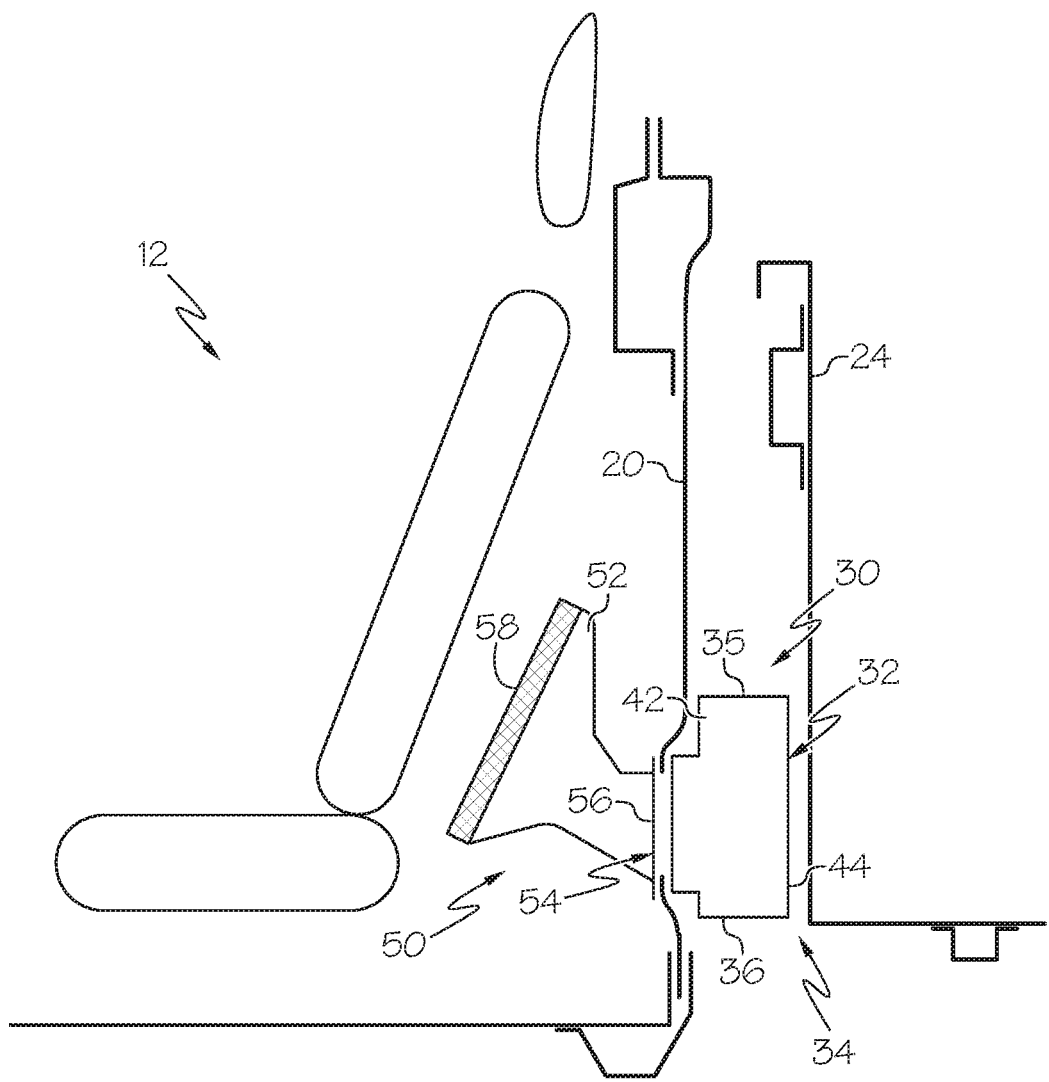
FIG. 3 schematically depicts a side view of the speaker assembly of FIG. 1 including a speaker that extends into a passenger cabin, according to one or more embodiments shown and described herein.

Referring also to FIGS. 2 and 3, a speaker assembly 30 includes a speaker enclosure 32 that is located in a space 34 between the front wall 24 of the truck bed 14 and the rear wall 20 of the passenger cabin 12. The speaker enclosure 32 includes a top wall 35, a bottom wall 36, end walls 38 and 40, a front wall 42 and a rear wall 44 forming a rectangular, box-shaped enclosure. In some embodiments, the speaker enclosure 32 is located entirely within the space 34 between the front wall 24 of the truck bed 14 and the rear wall of the passenger cabin 12 so that the speaker enclosure 32 may not be readily seen from outside the pickup truck 10. In some embodiments, the rear wall 44 of the speaker enclosure 32 may be spaced from the front wall 24 of the truck bed 14. The speaker enclosure 32 may be mounted to the rear wall 20 of the passenger cabin 12 using any suitable method, such as fastening and/or welding. Further, the speaker enclosure 32 may be formed of any suitable material, such as metal, wood, plastic or combinations thereof. The speaker enclosure may be empty, or may be filled with a material, such as a fibrous material like fiberglass.

Figure 4:
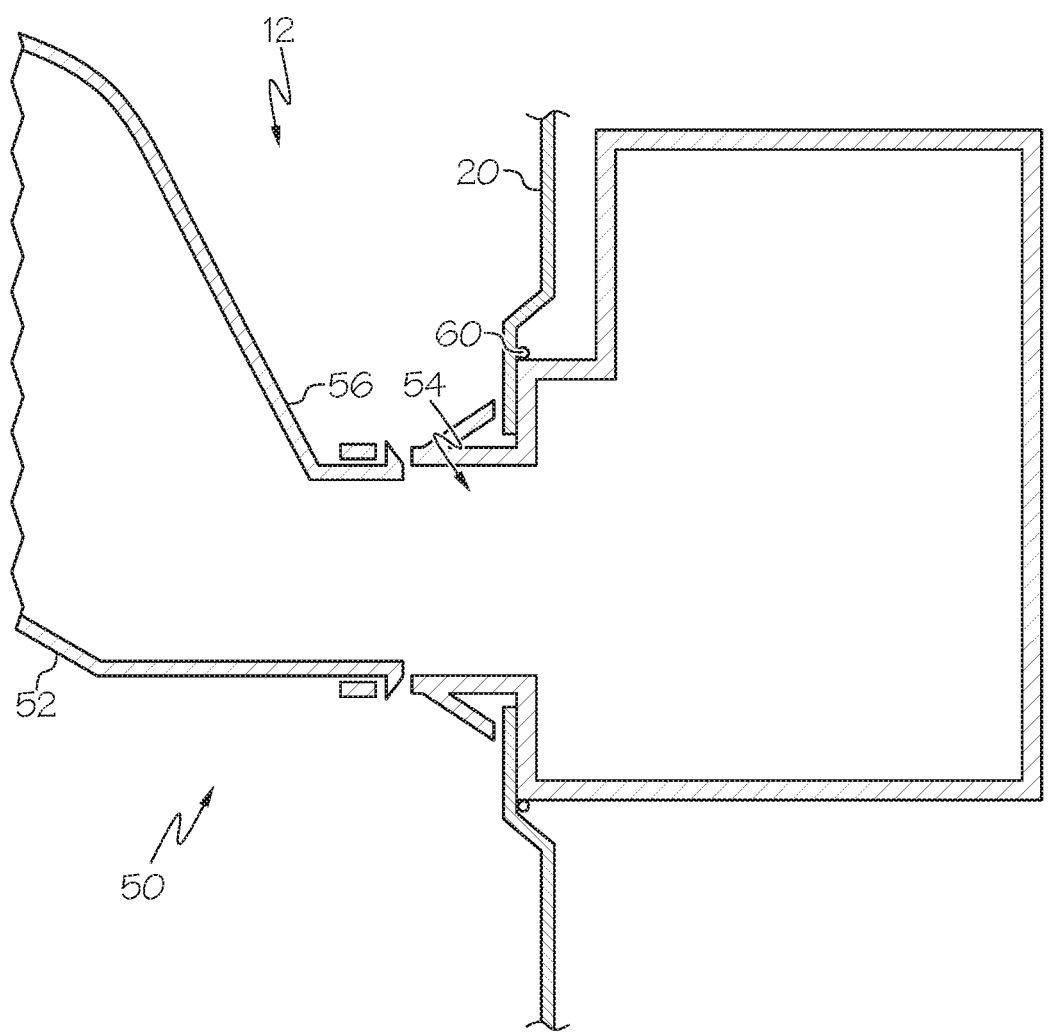
FIG. 4 schematically depicts a section view of the speaker assembly including speaker enclosure and speaker of FIG. 3, according to one or more embodiments shown and described herein.

Referring also to FIG. 4, a speaker 50 includes a speaker body 52 that extends forward from the speaker enclosure 32 and through an opening 54 through the rear wall 20 of the passenger cabin 12. The speaker body may be cone-shaped increasing in diameter from a rear end 56 to a front end 58. The front end 58 may be located forward of the rear wall 20 of the passenger cabin 12. The speaker 50 includes components suitable for operating as a speaker, such as magnets, voice coil, former, cone body, etc. In some embodiments, the speaker 50 is a subwoofer that operates in a frequency range of below 200 Hz. In some embodiments, the front end 58 may be covered using a mesh to provide added protection for components of the speaker 50. A gasket 60 or other type of seal may be provided between the speaker enclosure 32 and the rear wall 20 of the passenger cabin 12 to inhibit passage of water and other unwanted items therethrough.

Referring again to FIG. 2, the speaker enclosure 32 may include a port 62 that is also attached to the rear wall 20 of the passenger cabin 12 at an opening 64. In some embodiments, a port tube 66 may extend from the port 62. The port tube may 66 may terminate the rear wall 20, or the port tube 66 may extend into the passenger cabin 12. The port 62 can be provided to improve low-frequency output and/or increase efficiency.

Figure 5:
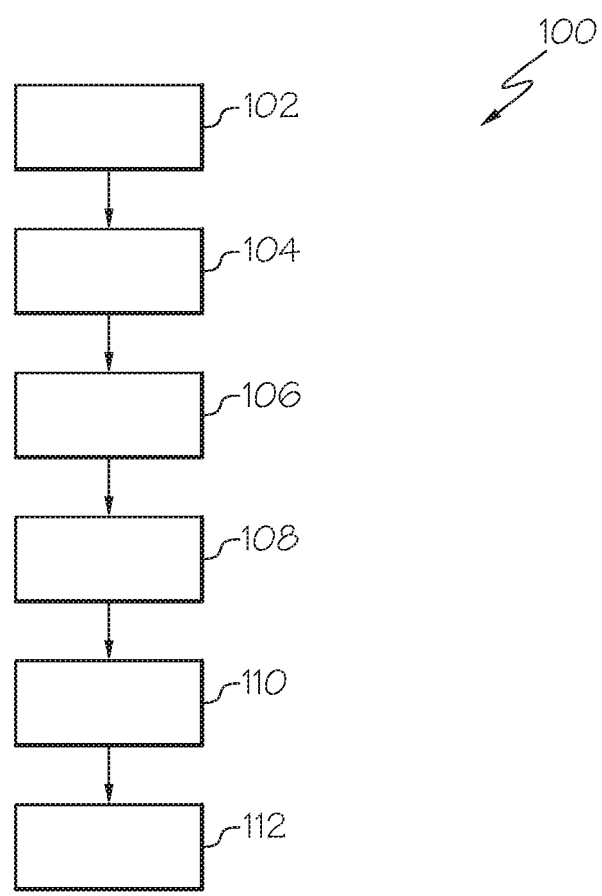
FIG. 5 illustrates a method of installing a speaker assembly into a pickup truck, according to one or more embodiments shown and described herein.

Referring to FIG. 5, a method 100 of installing a speaker assembly into a pickup truck includes providing a space between a front wall of a truck bed and a rear wall of a passenger cabin that is sized to receive a speaker enclosure at step 102. At step 104, the rear wall of the passenger cabin is provided with an opening that is sized to receive a speaker therethrough. A speaker is inserted through the opening, the speaker has a speaker body that extends forward from the speaker enclosure such that a front end of the speaker is located within the passenger cabin at step 106. The speaker enclosure is mounted to the rear wall of the passenger cabin at step 108 such that the speaker enclosure is located between the front wall of the truck bed and the rear wall of the passenger cabin and the speaker extends through the opening and into the passenger cabin. In some embodiments, another opening is provided through which a port tube extends from a port of the speaker enclosure at step 110. In some embodiments, a seal is provided between the speaker enclosure and the rear wall of the passenger cabin to seal the opening from the environment at step 112.

The above-described speaker systems include speaker enclosures that are mounted on an exteriors of vehicles, such as pickup trucks. The speaker systems include a speaker (e.g., a subwoofer) that extends outwardly from the speaker enclosures, through an opening in the rear wall of a passenger cabin and into the passenger cabin. Such an arrangement can allow pressure created by the speaker to exit the passenger cabin and enter into the speaker enclosure mounted externally to the passenger cabin. The speaker enclosure can be mounted between the front wall of the truck bed and the rear wall of the passenger cabin, thus being hidden from view from outside the vehicles. The speaker housing may have seals to inhibit water, dust and moisture from intruding into the passenger cabin.

While pickup trucks are described above, the speaker systems may be mounted in a sedan or SUV type of vehicle. The speaker enclosure may be externally mounted underneath the vehicle or rear bumper, depending on package restrictions and mounting location. Size and shape of the speaker enclosure may be selected depending on package restrictions of the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pickup truck comprising:
   a passenger cabin comprising a rear wall;
   a truck bed comprising a front wall that faces the rear wall of the passenger cabin, wherein a space is provided between the rear wall of the passenger cabin and the front wall of the truck bed; and
   a speaker assembly comprising:
      a speaker enclosure mounted externally to the rear wall of the passenger cabin and located between the rear wall of the passenger cabin and the front wall of the truck bed; and
      a speaker that extends forward from the speaker enclosure and through an opening in the rear wall of the passenger cabin.

2. The pickup truck of claim 1 further comprising a seal between the speaker enclosure and the rear wall of the passenger cabin that inhibits contaminants from entering the opening in the rear wall.

3. The pickup truck of claim 1, wherein a front end of the speaker is spaced from the rear wall of the passenger cabin.

4. The pickup truck of claim 3, wherein the speaker comprises a speaker body that increases in diameter toward the front end.

5. The pickup truck of claim 3, wherein the front end of the speaker is located behind a seat.

6. The pickup truck of claim 1, wherein the speaker is a subwoofer.

7. The pickup truck of claim 1, wherein the speaker enclosure comprises a port that is in communication with another opening in the rear wall of the passenger cabin.

8. The pickup truck of claim 7 comprising a port tube that extends from the port and is connected to the rear wall of the passenger cabin.

9. A method of installing a speaker assembly into a pickup truck, the method comprising:
   inserting a speaker through an opening in a rear wall of a passenger cabin of the pickup truck; and
   mounting a speaker enclosure to the rear wall of the passenger cabin, the speaker enclosure located between a front wall of a truck bed and the rear wall of the passenger cabin, the speaker extending forward from the speaker enclosure.

10. The method of claim 9 further comprising providing a space between the rear wall of the passenger cabin and the front wall of the truck bed that is sized to receive the speaker enclosure.

11. The method of claim 9 connecting a port of the speaker enclosure to another opening in the rear wall of the passenger cabin.

12. The method of claim 11, wherein the port of the speaker enclosure is connected to the another opening using a port tube.

13. The method of claim 9 further comprising providing a seal between the speaker enclosure and the rear wall of the passenger cabin and inhibiting contaminants from entering the opening in the rear wall.

14. The method of claim 9, wherein a front end of the speaker is spaced from the rear wall of the passenger cabin.

15. The method of claim 14, wherein the speaker comprises a speaker body that increases in diameter toward the front end.

16. The method of claim 14 comprising locating the front end of the speaker behind a seat.

17. The method of claim 9, wherein the speaker is a subwoofer.

* * * * *